INVENTORS
Roland V. Hutchinson
Lothrop M. Forbush
John M. Winston
Walter H. Zimmerman
BY
*D C Staley*

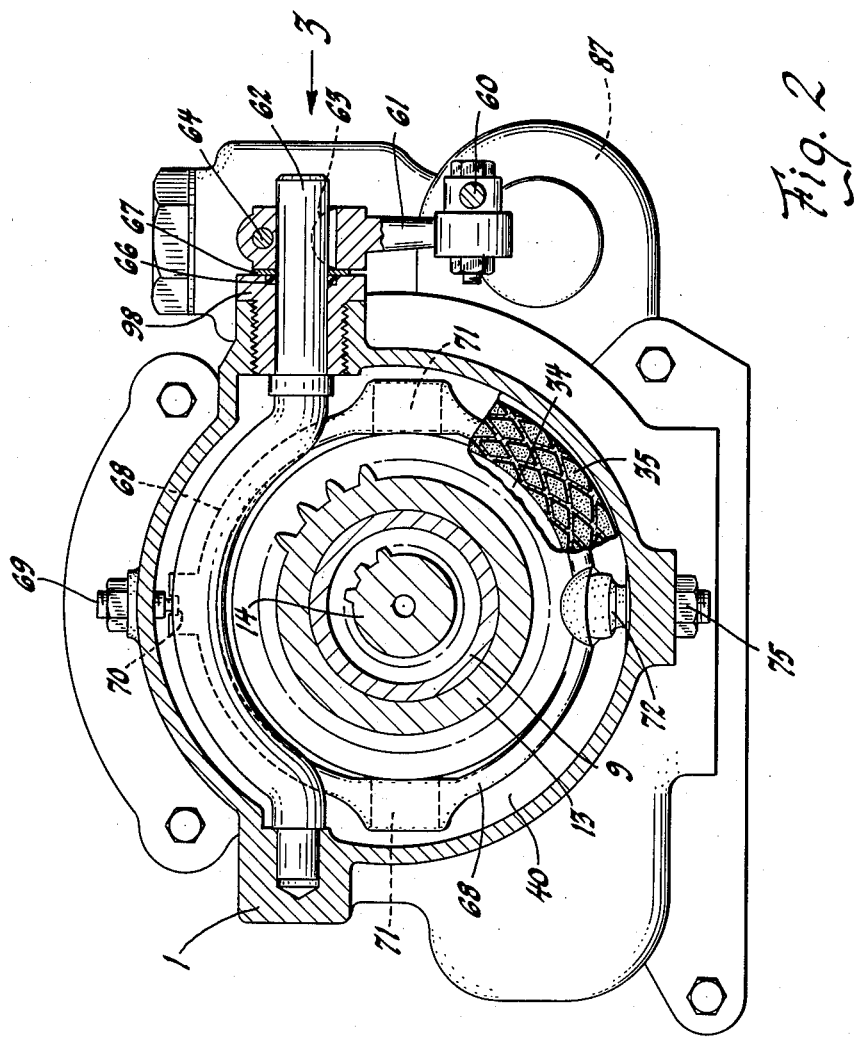

THEIR ATTORNEY

May 30, 1961  R. V. HUTCHINSON ET AL  2,986,237
DRIVE SHAFT POWER ACTUATOR FOR HYDRAULIC BRAKES
Filed July 31, 1958  4 Sheets-Sheet 4
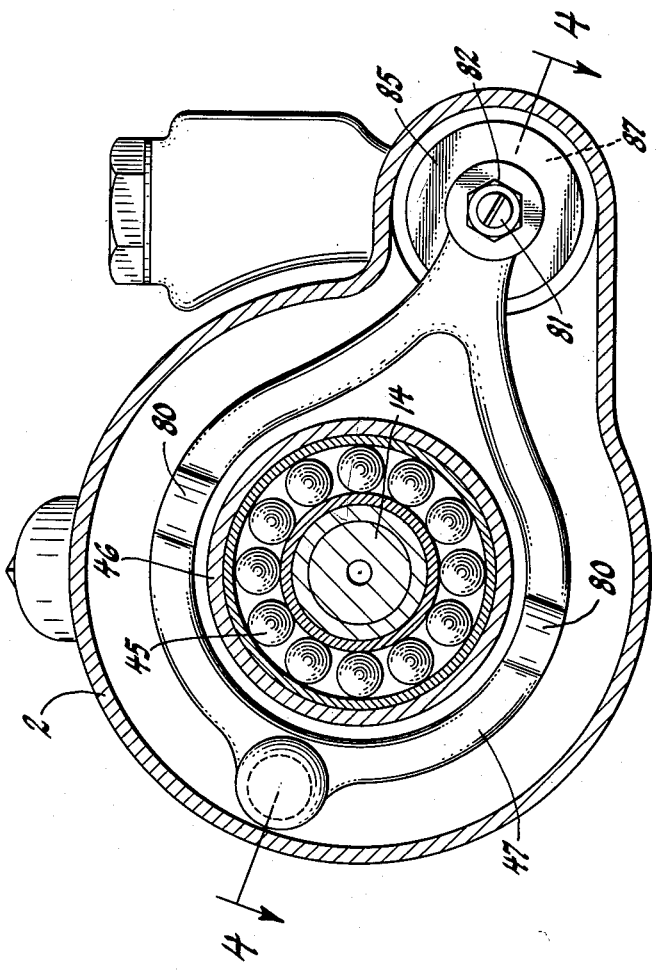
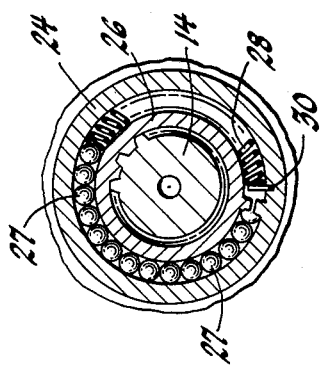
INVENTORS
Roland V. Hutchinson
Lothrop M. Forbush
John M. Winston
Walter H. Zimmerman
BY
*D C Staley*
THEIR ATTORNEY United States Patent Office 2,986,237
Patented May 30, 1961

2,986,237
DRIVE SHAFT POWER ACTUATOR FOR HYDRAULIC BRAKES

Roland V. Hutchinson, Lothrop M. Forbush, and John M. Winston, Birmingham, and Walter H. Zimmerman, Royal Oak, Mich., assignors to General Motors Corporation, Detroit, Mich., a corporation of Delaware Filed July 31, 1958, Ser. No. 752,351

4 Claims. (Cl. 188—140)

This invention relates to a vehicle brake and more particularly to a power unit which operates from the drive shaft or propeller shaft of a motor vehicle and is employed to operate the hydraulic master cylinder of a vehicle braking system.

Various means have been employed as a power unit for operating vehicle brakes, and various sources of power have also been used such as vacuum and compressed air. A source of power, such as the drive shaft, has the advantage of being available at all times when the vehicle is in motion. The drive shaft also provides adequate power for operation of a power unit for vehicle brakes.

It is the object of this invention to use the drive shaft as a source of power for the actuating means of the hydraulic master cylinder of a vehicle braking system.

It is another object of this invention to use a combination of levers and a ball screw nut and ball screw internally mating sleeve on a drive shaft in a power unit for a vehicle braking system.

It is a further object of this invention to employ rotating braking disks connected to the ball screw nut and stationary braking disks connected to the casing of the power unit for controlling the motion and the mechanism within the drive shaft operated brake power unit.

It is a further object of this invention to employ the drive shaft as a power means for operating a cooling pump for cooling the braking means within the drive shaft or power unit casing when the power unit is in operation.

It is a further object of this invention to provide a valve means for controlling the circulation of cooling and lubricating fluid to the brake power unit operated by the drive shaft.

It is also the object of this invention to provide a braking means regardless of the rotation of the drive shaft. The device operating as a power unit employs a ball screw nut and an internal concentrically mounted ball screw sleeve to provide axial movement of either member depending upon direction of rotation of the drive shaft.

The objects of this invention are accomplished by means of harnessing the power in the rotating drive shaft of a vehicle. A ball screw nut with a helical groove about its inner periphery is placed about the outer periphery of a mating helical grooved internal sleeve. This internal sleeve is spline connected to the drive shaft and is provided for axial movement upon said drive shaft. An annular member is placed about the outer periphery of the ball nut and is mounted in fixed relation to the ball nut. This drum carries rotating brake disks which are in rotation when the drive shaft is in rotation. Similar mating disks for engagement with these rotating disks are also disposed in alternate positions between the rotating disks and positioned on the casing member about the power unit. This casing unit is mounted on the rear end of the transmission of the motor vehicle. The opposite end of this casing is mounted on the universal joint housing which is directly connected to the torque tube.

A rotary pump is also mounted partially within the forward end of the power unit casing. This pump provides cooling fluid and lubricating fluid under pressure to valves which are located at the forward end of the ball nut and internal sleeve. A valve is placed on the forward end of each of these members and its opening depends upon the rotational direction of the drive shaft when the brakes are actuated.

A lever is connected to a cross member extending through the power unit casing at the forward end of the casing member. This shaft has an offset portion which actuates a pivoting lever which bears against a collar or annular plate which is placed adjacent to the brake disks within the power unit. As this collar is moved axially rearward by the brake operating arm, the brake disks engage each other and retard the rotation of the rotating disks. This moves the ball screw or ball sleeve against the collar which, in turn, actuates another lever. This second lever is directly connected to the rod in the master cylinder and provides for operation of the brake actuating fluid system.

This device provides for operation of the vehicle brakes at all times when the vehicle is in motion and operates directly from the vehicle propeller shaft. It also provides a conventional pump which is used for lubricating of the transmission and also provides for cooling of the braking device within the power unit. The circulation of the fluid is dependent upon operation of the power unit. The drive shaft, or propeller shaft is connected to the vehicle engine in a conventional manner and also is connected by means of a universal joint in a conventional manner to the rear end of the vehicle and the vehicle wheels.

Further objects and advantages of the present invention will be apparent from the following description, reference being had to the accompanying drawings wherein preferred embodiments of the present invention are clearly shown.

In the drawings:

Fig. 2 is a cross-section view taken on line 2—2 of Fig. 1. This view shows the operating levers, the drive shaft, and power unit casing in the forward end of the power unit.

Fig. 3 is a side view of the brake operating lever as shown by arrows 3 of Fig. 2. This view shows only the lever and a connecting rod which is used for operation of the power unit.

Fig. 5 is a cross-section view taken on line 5—5 of Fig. 4 and shows an end view of the hydraulic master cylinder. This view shows that the hydraulic master cylinder is not mounted directly beneath the propeller shaft.

Fig. 6 is a fragmentary view of the ball retainer means of the ball groove.

Figure 1:
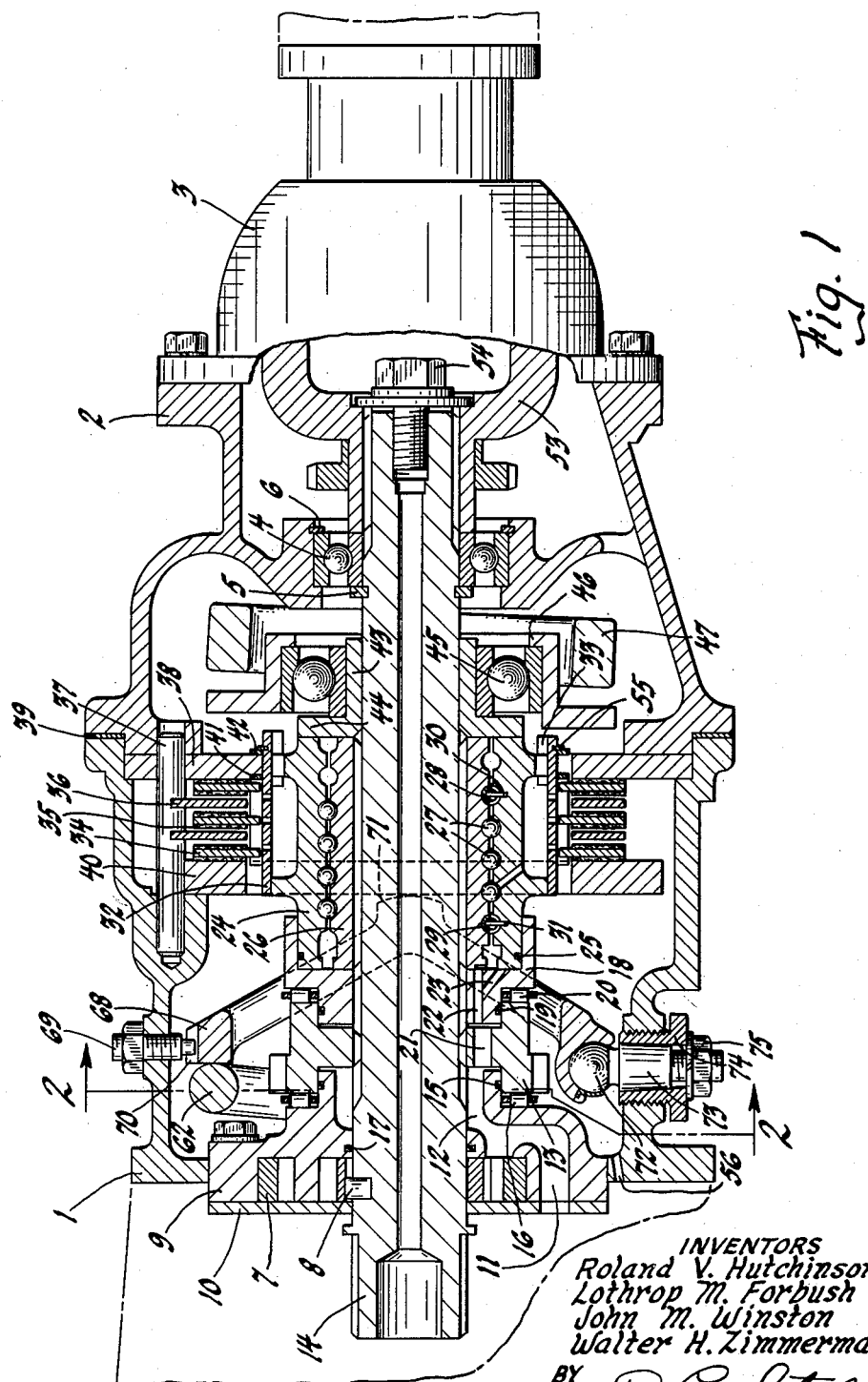
Fig. 1 is a cross-section view of the power unit and is cut on a line vertically through the center line of the propeller shaft.

Fig. 1 shows the main portion of the power unit. The forward end of the power unit is connected to the vehicle transmission which is shown by a phantom line. The front portion of the casing 1 is directly connected to the transmission housing, and the rear portion is directly connected to casing 2. The rear portion of the casing 2 is also connected to the universal joint housing 3 which is directly connected to the torque tube shown by phantom line on the rearward portion of this view. Within the rear casing 2 a ball bearing assembly 4 is mounted. Rear casing 2 has a portion extending radially inward with an annular facing to receive this ball bearing assembly 4. A snap ring 5 is placed at the forward end of the ball bearing assembly 4. At the rearward side of the ball bearing assembly 4 another snap ring 6 is placed adjacent the outer periphery of the ball bearing assembly 4. This snap ring 6 engages a groove in the inner periphery of the annular facing of the rear casing 2.

The forward end of the drive shaft is mounted within a conventional cooling fluid pump 7. This cooling fluid pump is connected by means of a pin 8 and is received within a cooling fluid pump housing 9. An end plate 10 is mounted on the forward side of the cooling fluid pump. A passage means 11 is provided from the rearward side of the cooling fluid pump and passes around underneath the pump in a forward direction to the transmission. In this way the pump serves as a lubrication pressurizing means for the transmission. A second passage 12 is also provided extending rearward from the cooling fluid pump. This passage 12 provides means for conducting the fluid rearward to braking means in the power unit. An annular member 13 is mounted adjacent to and rearward of the pump housing 9 and provides means for locking the drive shaft for parking as is done in a conventional automatic transmission when the range elector is in the "Park" position. This annular member 13 is spline connected to the drive shaft 14 and is provided with roller thrust bearings 16 and 20 on each end to provide means for transmitting the axial thrust reaction of either the rotating ball nut 24 or the ball sleeve 26 into the transmission case through the annular members 18 and 13. A seal member 15 is provided between the pump housing and this annular member and at the point where the drive shaft and housing member are rotatively connected, an additional seal 17 is also located.

At the rearward portion of the annular member 13 another annular member 18 is disposed with similar seals 19 and roller thrust bearing 20 to that of seal 15 and roller thrust bearing 16 of annular member 13. This annular member 18 also is not spline connected to the drive shaft 14, but free to rotate. These two annular members are also provided with fluid passage means 21 in member 13 and 22 and 23 in member 18. At the rearward end of the passage means 22 and 23 a control valve means for the movement of the fluid is provided, this control being the inner ball groove sleeve and the outer ball groove nut. Seal means is also provided between the member 18 and the ball nut 24 by a seal 25. The ball groove sleeve 26 is spline connected to the drive shaft 14 and has means for axial movement on the drive shaft. This ball groove sleeve 26 has a helical groove about its outer periphery. The ball groove nut 24 has a mating helical groove on its inner periphery and is mounted concentrically about the ball groove sleeve 26. A plurality of spherical balls 27 are placed within these grooves and are maintained within the central portion of the helical groove. These balls are maintained in the central portion of the helical groove by means of a spring 28 on the rearward end of the groove and a spring 29 on the forward end of the helical groove. This spring 28 is mounted in the helical groove in a fixed position by means of a pin 30. The spring 29 in the forward end of the helical groove is also fixed in its position by means of a pin 31.

The ball groove nut 24 is received within a sleeve member 32 and is mounted concentrically within this member 32. The sleeve member 32 is mounted in a slidable relation to the ball groove nut 24 by means of spline 33. About the outer periphery of this sleeve member is provided a spline for connecting rotation disks 34. These rotating disks 34 are also coated with a friction material 35. Stationary disks 36 are alternately spaced between the rotating disks 34. The stationary disks 36 are mounted on pins 37 which are received within mating holes in the casings 1 and 2. These pins also provide the means for mounting of backing plate 38. The backing plate 38 is also received within the casing 1 and adjacent to the end of casing 2. A seal 39 is provided between casings 1 and 2 and abutting a radial flange at their outer peripheries. The pin 37 also serves as a means for mounting the pressure plate 40 which is disposed adjacent to the forward side of brake disks 34 and 36.

A washer 41 is placed between the backing plate 38 and the splines of the sleeve member 32. A second washer 42 is also located rearward of the pressure plate 38 and about the outer periphery of sleeve member 32. These members are located in position by means of a snap ring 55.

Rearward of the ball groove nut and sleeve is located an annular member 43 with a radial flange 44. About the outer periphery of the rear portion of member 43 a ball bearing assembly 45 is mounted. This ball bearing assembly 45 is, in turn, mounted within a sleeve 46. The sleeve 46 is provided with a radial flange extending outward on its forward end and a radial flange extending inward on the rearward end.

Figure 4:
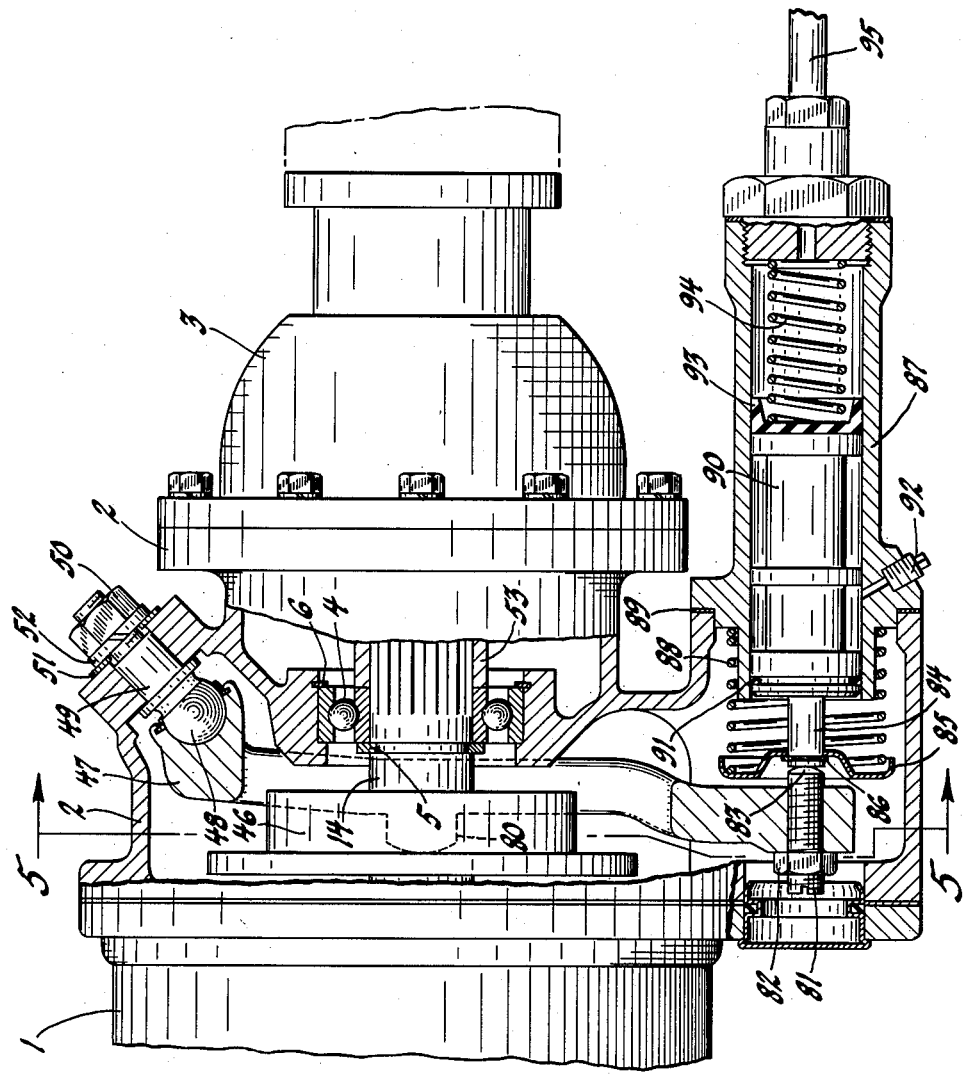
Fig. 4 is a cross-section view of the power unit which is taken on line 4—4 of Fig. 5. This view shows the operating levers in the rear portion of the power unit and its means for connection and operation of the master cylinder.

The flange extending radially outward on member 46 engages a lever 47 as shown in Fig. 4. The lever 47 is pivotally mounted on a ball support 48. This ball support 48 has a cylindrical portion 49 which is received within the rear casing 2 and locking position by means of a nut 50 and washer 51 and a lock washer 52.

The drive shaft 14 extends axially through the center of the power unit. This shaft 14 is connected to a universal joint 53 and is locked in position by means of a screw 54 which threadedly engages the end of the drive shaft.

Fig. 2 and Fig. 3 show the levers for operating the power unit. The rod 60 is connected to a lever 61 externally of the brake power unit. The rod 60 extends forward to the lever or actuating means controlled by the operator of the vehicle. The lever 61 is connected to a shaft 62 which has an offset center portion within the power unit. The connection between shaft 62 and lever 61 is by means of a key 63 and a bolt 64 and nut 65. The shaft is mounted with one end in a bearing portion of casing 1 and the opposite end mounted in a sleeve 98 which is threadedly connected to the casing 1. A sealing means 66 and a washer 67 are also provided on the outer part of the shaft 62. The off-center portion of shaft 62 extends into the upper portion of the power unit. A limited rotation of the shaft is permitted as it engages a pivoting lever 68. The lever 68 is guided at its upper portion by a lock screw 69 which extends inward to slot 70 of lever 68. The central portion of this lever has two arcuate bumpers 71 for engaging the pressure plate 40. The lower portion of lever 68 is pivotally mounted on a ball support 72 which has a cylindrical portion 73 extending into a sleeve 74. This support member 72 is securely fastened to the sleeve 74 by a nut 75. The sleeve 74 threadedly engages the lower portion of the casing 1. The lever 68 actuates the braking means within the power unit and thereby provides for retarded rotation of the ball groove nut 24. The retarded rotation of this nut 24 either moves the ball groove nut 24 or the ball groove sleeve 26 axially rearward. This, in turn, engages the collar 44 of the sleeve 43. The rearward movement of sleeve 43 also moves the annular sleeve 46 rearward. This sleeve 46 engages an arcuate portion 80 of lever 47.

The lever 47 has a set screw 81 mounted on its outward end. This screw is locked in position by means of a nut 82. The forward end of screw 81 has an arcuate portion 83 for engaging the forward end of rod 84. The rod 84 is provided with a plate 85 locked in position by a snap ring 86. This rod extends inward of the master cylinder 87. A compression spring 88 provides return movement of the master cylinder and is disposed between the master cylinder 87 and the sheet metal plate 85. The hydraulic master cylinder 87 is directly connected to the casing member 2. A seal 89 is placed between the two members to provide a means of retaining the fluid within the casing member. The cylinder 87 houses a piston member 90, the piston member being directly connected to the piston rod 84. A seal 91 is disposed on the rearward end of the piston within the inner periphery of the cylinder 87. The plug 92 located at the underside of the hydraulic master cylinder is to provide drainage for any fluid which may leak by the piston 90. The forward end of the piston 90 also is provided with a seal 93 and a spring 94 which retains the seal in position as well as returning the piston to its normal location when the brakes are not in operation. The tube 95 is connected to the wheel brake cylinders.

In operation, the power unit operates in the following manner: As the actuating rod 60 is moved forward, the lever 61 pivots the off-center shaft 62 within the upper portion of a power unit casing 1. The offset portion of shaft 62 then engages the upper portion of lever 68. As the lever 68 pivots rearward, the arcuate portion 71 engages the pressure plate 40. Upon rearward movement of the pressure plate 40 the disks 34 and 36 engage each other. The friction from the stationary disks 36 retard the rotation of the rotating disks 34 and thereby cause the ball groove nut 24 to move axially rearward. The spherical balls held within the groove operate as an antifriction means for transmitting a force from the ball groove sleeve 26 to the ball groove nut 24. The ball groove nut 24, upon moving rearward, opens a port 23 in the annular member 18 and thereby provides an opening for the cooling fluid for passage from the cooling fluid pump 7 to the brake disks within the power unit. The friction material 35 is provided with grooves to allow passage of the fluid radially outward between the brake disks. The fluid returns by flowing axially forward within the casing 1 of the power unit. An opening 56 is provided in the forward end of the casing 1 for return of the fluid to the opposite side of the cooling fluid pump.

As the ball groove nut 24 moves further axially rearward, it engages radial flange portion 44 of the sleeve 43 which carries the ball bearing assembly 45. The sleeve 46 carried on the ball bearing assembly 45 also is moved rearward and the radially outward extending flange engages the arcuate portion 80 of lever 47. This lever 47 pivots upon the ball support 48 while the opposite end moves rearward. The set screw 81 engages the master cylinder rod 84 and moves rearward against the spring 88. The spring 94 also retards movement of the piston 90 within the cylinder 87. As the piston 90 moves rearward within the cylinder 87, the fluid system for operating the brakes becomes pressurized. In this manner the brakes of the vehicle are operated. The springs 88 and 94 return the lever 47 and ball screw nut and sleeve to the original position.

This power unit provides for the operation of the brakes at all times in which the vehicle is in motion. In event that the vehicle is moving in the opposite direction, as previously described, the ball groove nut 24 remains in a stationary position in relation to the power unit casing. The ball groove sleeve 26 then moves rearward opening the groove 22 in the sleeve 18 and thereby providing circulation of a cooling medium between brake disks of the power unit. The ball groove sleeve 26, which is in engagement with the flange 44 of sleeve 43, operates the braking means in the same fashion as previously described.

While the embodiments of the present invention as herein disclosed constitute a preferred form, it is to be understood that other forms might be adopted.

What is claimed is as follows:

1. A drive shaft operated power unit for actuating vehicle brakes comprising in combination, a power unit housing, a drive shaft rotatably mounted within said housing, an input lever mounted externally on said power unit housing and adapted for operation by a brake actuating rod, said lever connected to a shaft mounted within said housing, said shaft having an offset portion for engaging a pivoting yoke, said yoke pivotally mounted within said power unit housing and straddling said drive shaft, a brake device within said housing including stator disks mounted on said housing, rotating disks mounted on a ball groove nut, a backing plate mounted concentric and rearward of said brake disks and abutting said brake disks, a pressure plate mounted concentric and forward of said disks and operated by said yoke, a ball screw arrangement including said ball groove nut for supporting said rotating disks, a ball groove sleeve mounted concentrically within said ball groove nut and spline connected to said drive shaft, a helical groove portion in said ball groove sleeve, a helical groove portion in said ball groove nut, a plurality of spherical balls received in said grooves thereby providing axial movement of said nut relative to said sleeve when rotated in relation to each other responsive to frictional engagement of said brake disks, an annular support mounted on said shaft, a collar formed on said annular support abutting the rearward edge of said ball groove nut and sleeve, a bearing mounted on said annular support, a second annular member carrying a radial flange mounted on said bearing, a pivoting lever mounted on said power unit housing actuated by said radial flange, said pivoting lever operating in response to relative axial movement of said ball groove nut relative to said ball groove sleeve to thereby actuate a fluid displacement member in a fluid braking system.

2. A brake power unit comprising in combination, a power unit housing, a drive shaft rotatably mounted within said housing, a cooling fluid pump operatively mounted in the forward end of said housing, a braking device mounted within said housing including stator disks mounted on said power unit housing, rotary disks for engagement with said stator disks and mounted on a ball groove nut member, a ball groove sleeve member concentrically mounted within said ball groove nut, a helical groove portion on the inner periphery of said ball groove nut and the outer periphery of said ball groove sleeve for receiving spherical balls to impart an axial thrust between said ball groove sleeve and said ball groove nut upon relative rotation of said sleeve and nut in response to frictional engagement of said brake disks, passage means from said fluid pump to said brake disks, valve means in said passage means formed by said ball groove nut and said ball groove sleeve, grooves within said disks for providing passage of fluid from the inner portion of said disks to the radially outer portion of said brake disks, fluid passage means within said casing for return of fluid to the input side of said fluid pump, an external lever connected to the outside of said housing and adapted for actuation by a brake control, a shaft having an offset portion mounted in said housing for engagement with a yoke member, said yoke member pivotally mounted within said housing, a pressure plate mounted adjacent one side of said brake disks for actuation by axial movement of said yoke member, a backing plate adjacent said brake disks but on the opposite side of said brake disks and abutting a portion of said housing, an annular member mounted adjacent the ball groove nut and sleeve adapted for axial movement on said drive shaft when said ball groove nut and ball groove sleeve is rotated in relation to each other thereby causing axial movement of said ball groove sleeve relative to said ball groove nut, a second yoke mounted in rearward portion of said housing for engagement by said annular member to cause second yoke to operatively engage a piston rod in a fluid displacement member to pressurize fluid for actuating a vehicle braking system.

3. A brake power unit comprising in combination, a power unit housing, a drive shaft rotatably mounted within said housing, an external lever connected to the outside of said housing adapted for actuation by a brake control, a shaft having an offset portion engaging a yoke member mounted in said housing and connected to said external lever, said yoke member pivotally mounted within said housing and encircling said drive shaft, a braking device mounted within said housing including one or more stator disks mounted on said power unit housing, one or more rotating disks for engagement with said stationary disks, a ball groove nut mounted within said rotating disks, a ball groove sleeve mounted concentrically within said ball groove nut, a helical groove portion on the inner periphery of said ball groove nut, a helical grooved portion on the outer periphery of said ball groove sleeve, a plurality of spherical balls for reception within said helical grooved portion of said ball groove nut and said ball groove sleeve, a pressure plate mounted concentric with and adjacent to said brake disks for actuation by axial movement of said yoke member, a backing plate concentric with and adjacent to said brake disks but on the opposite side of said brake disks from said pressure plate and abutting a portion of said housing, an annular member mounted adjacent the ball groove nut and said ball groove sleeve, adapted for axial movement on said drive shaft when said ball groove nut and said ball groove sleeve is rotated in relation to each other thereby causing an axial movement of said ball groove sleeve relative to said ball groove nut, a second yoke mounted in the rearward portion of said housing for engagement by said annular member to cause said second yoke to operatively engage a piston rod in a fluid displacement member to pressurize fluid for actuation of the vehicle braking system.

4. A brake power unit comprising in combination a power unit housing, a drive shaft rotatably mounted within said housing, an external lever connected to the outside of said housing adapted for actuation by a brake control, a shaft connected to said external lever having an offset portion mounted in said housing for engagement with a yoke member, said yoke member pivotally mounted within said housing, a braking device mounted within said housing including one or more stator disks mounted on said power unit housing, one or more rotating disks for frictional engagement with said stationary disks, a ball groove nut for supporting said rotating disks, a ball groove sleeve mounted concentrically within said ball groove nut, a helical grooved portion on the inner periphery of said ball groove nut, a helical grooved portion on the outer periphery of said ball groove sleeve, a plurality of spherical balls for reception within said ball groove portion of said ball groove nut and said ball groove portion of said ball groove sleeve to impart an axial thrust between said ball groove sleeve and said ball groove nut upon relative rotation of said sleeve and said nut in response to frictional engagement of said brake disks, a cooling fluid pump operatively mounted within said housing, a cooling fluid system including grooves in said brake disks, control valve means in said cooling fluid system including said ball groove nut and said ball groove sleeve, said ball groove nut and said ball groove sleeve opening said valve means upon relative movement to each other to provide circulation of cooling fluid through said grooves in said brake disks, a pressure plate mounted adjacent one side of said brake disks for actuation by axial movement of said yoke member, a backing plate concentric with and adjacent to said brake disk but on the opposite side of said brake disk from said pressure plate and abutting a portion of said housing, an annular member mounted adjacent said ball groove nut and said ball groove sleeve adapted for axial movement on said drive shaft when said ball groove sleeve is rotated in relation to each other thereby causing axial movement of said ball groove sleeve relative to said ball groove nut, a second yoke mounted in the rearward portion of said housing for engagement by said annular member to cause said second yoke to operatively engage a piston rod in a fluid displacement member to pressurize fluid for actuating a vehicle braking system.

References Cited in the file of this patent

UNITED STATES PATENTS

| | | |
|---|---|---|
| 1,775,479 | Arter | Sept. 9, 1930 |
| 2,855,076 | Rockwell | Oct. 7, 1958 |